(12) United States Patent
Divekar et al.

(10) Patent No.: US 10,049,285 B2
(45) Date of Patent: Aug. 14, 2018

(54) CONTROL SYSTEM FOR VEHICLE

(71) Applicant: MAGNA ELECTRONICS INC., Auburn Hills, MI (US)

(72) Inventors: Rohan J. Divekar, Auburn Hills, MI (US); Paul A. VanOphem, Washington, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/681,699

(22) Filed: Aug. 21, 2017

(65) Prior Publication Data

US 2017/0372151 A1    Dec. 28, 2017

Related U.S. Application Data

(63) Continuation of application No. 14/994,595, filed on Jan. 13, 2016, now Pat. No. 9,740,945.

(60) Provisional application No. 62/103,220, filed on Jan. 14, 2015.

(51) Int. Cl.
| | |
|---|---|
| *G06F 7/70* | (2006.01) |
| *G06K 9/00* | (2006.01) |
| *B60T 7/22* | (2006.01) |
| *B60T 7/18* | (2006.01) |
| *B60R 1/00* | (2006.01) |
| *G08G 1/16* | (2006.01) |

(52) U.S. Cl.
CPC ............ *G06K 9/00805* (2013.01); *B60R 1/00* (2013.01); *B60T 7/18* (2013.01); *B60T 7/22* (2013.01); *G08G 1/161* (2013.01); *B60R 2300/302* (2013.01); *B60R 2300/8093* (2013.01); *B60T 2201/022* (2013.01)

(58) Field of Classification Search
CPC ......... G06K 9/00805; B60R 1/00; B60T 7/18; B60T 7/22; G08G 1/161
USPC ......... 701/70, 301, 302, 519, 514, 497, 437, 701/436, 435, 433, 431, 423, 421, 414, 701/117–122, 93, 68
See application file for complete search history.

(56) References Cited

U.S. PATENT DOCUMENTS

| | | |
|---|---|---|
| 5,760,962 A | 6/1998 | Schofield et al. |
| 5,796,094 A | 8/1998 | Schofield et al. |
| 5,877,897 A | 3/1999 | Schofield et al. |
| 6,201,642 B1 | 3/2001 | Bos |
| 6,396,397 B1 | 5/2002 | Bos et al. |
| 6,405,132 B1 | 6/2002 | Breed et al. |
| 6,636,258 B2 | 10/2003 | Strumolo |

(Continued)

*Primary Examiner* — Muhammad Shafi
(74) *Attorney, Agent, or Firm* — Honigman Miller Schwartz and Cohn, LLP (57) ABSTRACT

A vehicular control system includes a camera and a control having an image processor that processes captured image data to determine an object present in the forward field of view of the camera. The control is operable to determine an estimated time to arrival of another vehicle at a location that is in the projected path of travel of the equipped vehicle. Responsive to the received information being indicative of the state of a signal light at an intersection being green and responsive at least in part to (i) determination that the estimated time to arrival of the other vehicle is at least a threshold amount and (ii) determination that an object is not present in the projected path of travel of the equipped vehicle, the control may determine that it is safe for the equipped vehicle to proceed along the projected path of travel.

20 Claims, 4 Drawing Sheets

(56) References Cited

U.S. PATENT DOCUMENTS

| | | |
|---|---|---|
| 6,690,268 B2 | 2/2004 | Schofield et al. |
| 6,693,517 B2 | 2/2004 | McCarthy et al. |
| 6,802,617 B2 | 10/2004 | Schofield et al. |
| 6,806,452 B2 | 10/2004 | Bos et al. |
| 6,822,563 B2 | 11/2004 | Bos et al. |
| 6,975,246 B1 | 12/2005 | Trudeau |
| 7,005,974 B2 | 2/2006 | McMahon et al. |
| 7,038,577 B2 | 5/2006 | Pawlicki et al. |
| 7,145,519 B2 | 12/2006 | Takahasi et al. |
| 7,161,616 B1 | 1/2007 | Okamoto et al. |
| 7,230,640 B2 | 6/2007 | Regensburger et al. |
| 7,248,283 B2 | 7/2007 | Takagi et al. |
| 7,295,229 B2 | 11/2007 | Kumata et al. |
| 7,301,466 B2 | 11/2007 | Asai |
| 7,580,795 B2 | 8/2009 | McCarthy et al. |
| 7,592,928 B2 | 9/2009 | Chinomi et al. |
| 7,720,580 B2 | 5/2010 | Higgins-Luthman |
| 7,855,755 B2 | 12/2010 | Weller et al. |
| 7,881,496 B2 | 2/2011 | Camilleri et al. |
| 7,991,522 B2 * | 8/2011 | Higgins-Luthman ..... B60R 1/00 701/28 |
| 9,740,945 B2 | 8/2017 | Divekar et al. |
| 2003/0095039 A1 | 5/2003 | Shimomura et al. |
| 2006/0254142 A1 | 11/2006 | Das et al. |
| 2009/0033474 A1 | 2/2009 | Chen |
| 2010/0085171 A1 | 4/2010 | Do |
| 2010/0328644 A1 * | 12/2010 | Lu .......... G01S 7/4802 356/5.01 |
| 2011/0032119 A1 | 2/2011 | Pfeiffer et al. |
| 2011/0313665 A1 * | 12/2011 | Lueke ............ G01S 13/931 701/301 |
| 2012/0062743 A1 * | 3/2012 | Lynam ............ B60Q 9/005 348/148 |
| 2012/0065858 A1 | 3/2012 | Nickolaou |
| 2012/0218412 A1 | 8/2012 | Dellantoni et al. |
| 2013/0116859 A1 | 5/2013 | Ihlenburg et al. |
| 2013/0181860 A1 * | 7/2013 | Le ............ G01S 13/931 342/72 |
| 2013/0342333 A1 | 12/2013 | Hutchings |
| 2014/0218529 A1 | 8/2014 | Mahmoud |
| 2014/0222323 A1 | 8/2014 | Purushothaman |
| 2014/0375476 A1 | 12/2014 | Johnson et al. |
| 2015/0124096 A1 | 5/2015 | Koravadi |
| 2015/0158499 A1 | 6/2015 | Koravadi |
| 2015/0251599 A1 | 9/2015 | Koravadi |
| 2015/0352953 A1 | 12/2015 | Koravadi |
| 2016/0071417 A1 * | 3/2016 | Lewis ............ G08G 1/162 701/301 |

* cited by examiner

CONTROL SYSTEM FOR VEHICLE

CROSS REFERENCE TO RELATED APPLICATIONS

The present application is a continuation of U.S. patent application Ser. No. 14/994,595, filed Jan. 13, 2016, now U.S. Pat. No. 9,740,945, which claims the filing benefits of U.S. provisional application Ser. No. 62/103,220, filed Jan. 14, 2015, which is hereby incorporated herein by reference in its entirety.

FIELD OF THE INVENTION

The present invention relates generally to a vehicle collision avoidance system for a vehicle and, more particularly, to a system that utilizes vehicle-to-vehicle communications.

BACKGROUND OF THE INVENTION

Use of vehicle-to-vehicle (V2V) communications and vehicle-to-infrastructure (V2I) communications are known. Such car2car or vehicle to vehicle (V2V) and vehicle to infrastructure (car2X or V2X or V2I) technology provides for communication between vehicles and/or infrastructure based on information provided by one or more vehicles and/or information provided by a remote server or the like. Examples of such systems are described in U.S. Pat. No. 7,580,795, which is hereby incorporated herein by reference in its entirety.

SUMMARY OF THE INVENTION

The present invention provides a collision avoidance system for a vehicle that utilizes information from V2V communication systems to determine the degree of hazard that an approaching vehicle represents to the equipped vehicle when the driver of the equipped vehicle is contemplating maneuvering the equipped vehicle into the path of travel of the approaching vehicle. The system may determine an estimated time to arrival of another vehicle at a location in the targeted path of travel of the equipped vehicle and may determine if the time to arrival is above a threshold time (whereby the system may indicate to the driver of the equipped vehicle that it is safe to proceed with the driving maneuver) or below a threshold time (whereby the system may indicate to the driver of the equipped vehicle that it is not safe to proceed with the driving maneuver). The system may be responsive at least in part to V2V communications and vehicle-to-infrastructure (V2I or V2X) communications and/or GPS data indicative of the location and movement of the equipped vehicle and the approaching vehicle. The system may also be responsive to image processing of image data captured by one or more cameras of the vehicle, such as a forward viewing camera. The image processor may, responsive to image processing of captured image data, determine a projected path of travel of the vehicle, and may determine the presence of an object in the projected path of travel.

These and other objects, advantages, purposes and features of the present invention will become apparent upon review of the following specification in conjunction with the drawings.

DESCRIPTION OF THE PREFERRED EMBODIMENTS

A vehicle collision avoidance system and/or driver assist system and/or alert system operates to determine when a collision may be likely and to provide a warning or alert to the driver. The system of the present invention utilizes vehicle-to-vehicle (V2V) communications and vehicle-to-infrastructure (V2I or V2X) communications to determine the approach of a vehicle to an intersection at or ahead of the subject vehicle. If the system determines that it is unsafe for the subject vehicle to proceed (such as to turn in a path that intersects the path of the approaching vehicle), the system generates an alert to the driver of the subject vehicle. The system may utilize the V2X communications to determine a status of a traffic light at the intersection and/or may utilize a GPS system of the vehicle to determine the location and separation distance of the vehicles, as discussed below. The vehicle communication systems may utilize aspects of the systems described in U.S. Pat. Nos. 6,690,268; 6,693,517; 7,156,796 and/or 7,580,795, and/or U.S. Publication Nos. US-2012-0218412, US-2012-0062743, US-2015-0158499; US-2015-0124096 and/or US-2015-0352953, which are all hereby incorporated herein by reference in their entireties.

Many accidents are caused at intersections, because these are the locations where two or more roads cross each other and activities, such as turning left, crossing over and turning right and the like, have the potential for conflicts resulting in crashes.

Often, at such intersections, accidents are caused due to driver misjudgment, either of the subject vehicle speed or trajectory or of an approaching vehicle speed or trajectory. For example, and such as shown in FIG. 1, drivers often misjudge the speed at which an approaching vehicle is arriving from the opposite direction at the intersection while the subject vehicle is turning left (and thus potentially crossing or intersecting the path of travel of the approaching vehicle).

Figure 1:
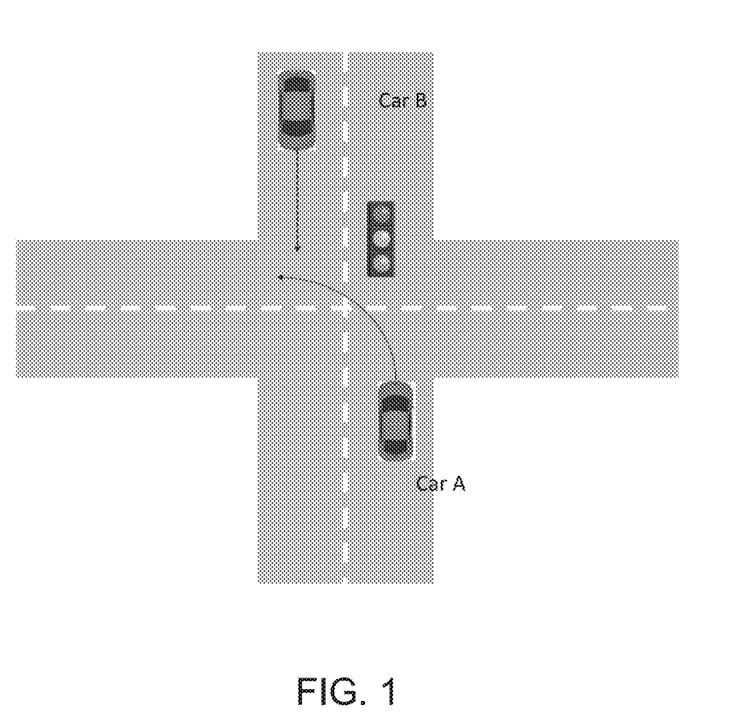
FIG. 1 is a plan view of an intersection showing a driving scenario where a vehicle equipped with the driver assistance system of the present invention is maneuvered through a left turn at the intersection.

As shown in FIG. 1, a possible collision scenario involves the subject vehicle (Car A), which has to yield to let the approaching vehicle (Car B) pass through the intersection. But Car A can make its left turn if Car B is far enough away from the intersection (and/or approaching the intersection at a slow enough speed). Often, it is difficult for a driver (such as the driver of Car A) to judge the speed of the oncoming car, and to judge the time required for it to reach the intersection. If the driver of Car A makes the decision to go even when Car B is approaching at the same time at the intersection, then a collision is possible.

The yield collision warning algorithm of the present invention can help the driver make a more safe and accurate decision in such a scenario and can prevent accidents. The algorithm and system of the present invention utilizes V2V (Vehicle to Vehicle) and V2I (Vehicle to Infrastructure)

sensors or communication systems to determine the likelihood or possibility of a collision and, if the system determines that a collision is possible or likely, the system generates an alert to warn the driver.

Figure 2:
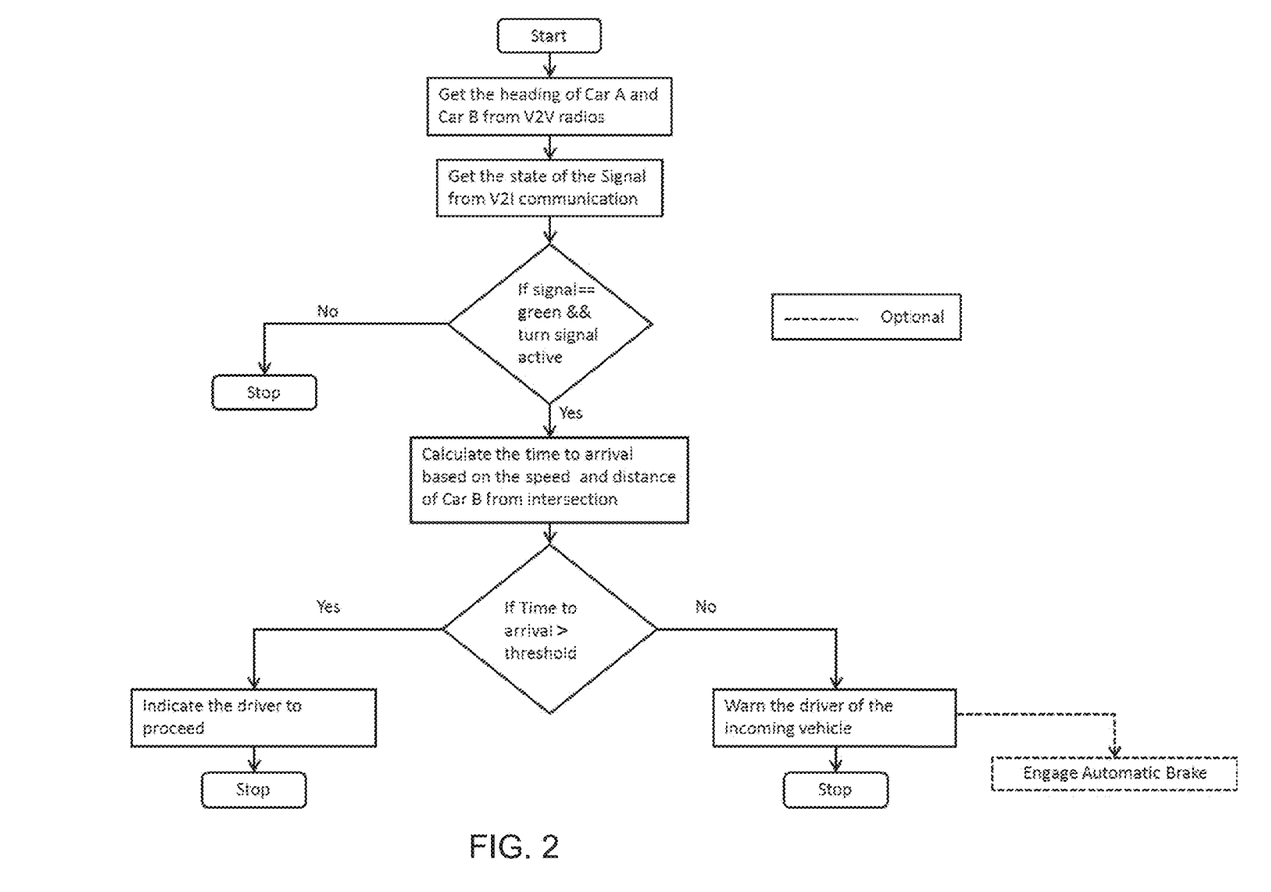
FIG. 2 is a flow chart of the algorithm of the driver assistance system of the present invention, showing the determination by the system whether or not it is safe for the vehicle to be driven through the intersection.

As shown in FIG. 2, the algorithm used to predict collision scenario receives heading information (such as speed and direction) of the approaching vehicle and of the subject vehicle, such as from V2V communication systems and V2V radios or transceivers of the vehicles. In the algorithm of the present invention, the heading angles of the approaching vehicle (CAR B) may be calculated from the GPS data and shared with Car A via V2V communication. Based on the determined heading angles, the direction of motion of each vehicle is calculated in relation to the other vehicle. The system or algorithm may also receive a communication from a V2X or V2I system that is indicative of the state of the stop light at the intersection (e.g., red, yellow, green), and the system may also determine whether or not the driver of the subject vehicle intends to turn across the intersection (such as responsive to a determination that a turn signal of the subject vehicle is activated).

As Car A and Car B both are communicating with the infrastructure (via V2X communication) they may also receive information on the distance from the intersection. Both these distances are taken into account by the algorithm (via receipt of such information from the V2X system) to predict the time to arrival of Car B to the intersection. If this time is sufficient enough for Car A to complete the left turn (i.e., the determined time to arrival of Car B at the intersection is greater than a threshold time or value), the driver is indicated to proceed, otherwise the driver is warned of the collision possibility.

Optionally, the algorithm can be further advanced to include automatic emergency braking, where the system will actuate or control the brake system of Car A to automatically brake the vehicle in the situation where the algorithm determines or calculates a high probability that a collision may occur. Optionally, the algorithm may be reversed in countries which have left hand drive systems for the vehicles.

Figure 3:
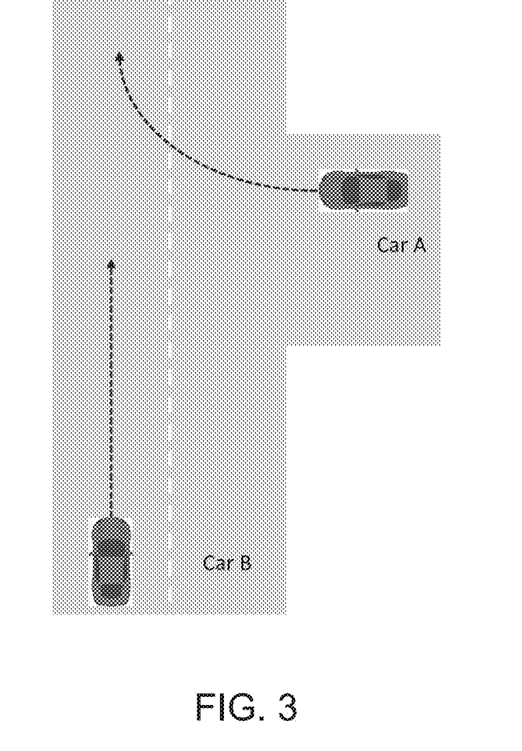
FIG. 3 is a plan view of another driving scenario where a vehicle equipped with the driver assistance system of the present invention is maneuvered onto a road and into the traffic traveling along the road.

With reference to FIG. 3, if the subject vehicle is at an entry to a road (such as if the driver of the subject vehicle in leaving a parking lot or the like) and the vehicle has to enter a high speeding lane, the driver of the subject vehicle has to judge the speed of the high speed vehicles approaching the subject vehicle location. A slight misjudgment can cause an accident.

Based on the V2V communications and GPS data, the system may calculate the lateral distance of the target (approaching) vehicle (Car B in FIG. 3) from the subject vehicle (Car A in FIG. 3). From this information, the system can further calculate the time to arrival of the target vehicle to the entry ramp or location of Car A where it is about to enter the road. The algorithm can alert the driver of Car A if there is a high probability of collision if the driver of Car A goes ahead with the turning/entering maneuver.

Figure 4:
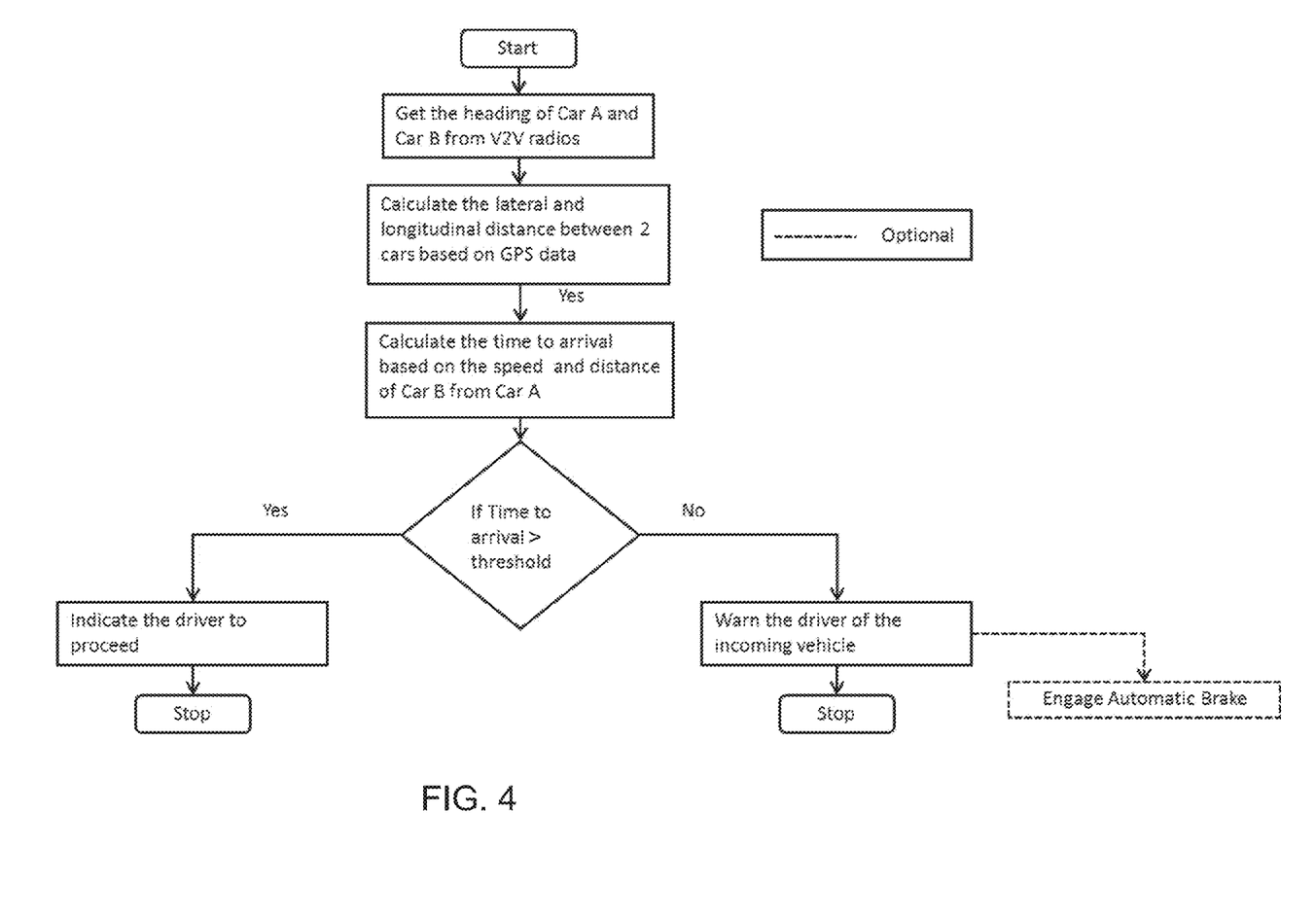
FIG. 4 is a flow chart of the algorithm of the driver assistance system of the present invention, showing the determination by the system whether or not it is safe for the vehicle to be driven into the traffic situation on the road.

As shown in FIG. 4, the algorithm used to predict such a collision scenario receives heading information of both vehicles, such as from V2V radios or the like and calculates the lateral and longitudinal distance between the vehicles based at least in part on GPS data or geographical location information. The system may determine the time to arrival based on the speed and distance from Car B to Car A. If the determined time to arrival is greater than a threshold time or value, then the system determines that there is sufficient space for the subject vehicle to enter the road lane and may indicate to the driver to proceed with the driving maneuver. However, if the determined time to arrival is less than the threshold time or value, then the system determines that there is not sufficient space for the subject vehicle to enter the road lane and may alert the driver to not proceed with the driving maneuver.

The algorithm of the present invention may also apply to the scenario where the vehicle turning right on a red signal fails to yield for the oncoming vehicle. Optionally, the algorithm can be further advanced to include automatic emergency braking, where the system will actuate or control the brake system of Car A to automatically brake the vehicle in the situation where the algorithm determines or calculates a high probability that a collision may occur. Optionally, the algorithm may be reversed in countries which have left hand drive systems for the vehicles.

Another common scenario is where a driver is turning out of a parking lot and has to cross or cut through multiple lanes of slow moving traffic (such as traveling left to right in front of the vehicle) to get to the far lanes to are traveling in the opposite direction (such as right to left in front of the vehicle). This is often a very dangerous situation especially when there is a left turn lane present and other vehicles are traveling faster in the left turn lane. The system of the present invention may utilize V2V communications to determine the speed and location of the other vehicles on the road and can protect/warn of potential collisions as the subject vehicle is driven out of the parking lot (or side street or the like).

Therefore, the algorithm/feature or system of the present invention can be useful for drivers to avoid conflicts and accidents due to misjudgment at an intersection or any free turn on right scenarios. The algorithm of the present invention can be further used as a part of an autonomous or partial autonomous vehicle control system.

Optionally, the vehicle collision avoidance system and/or driver assistance system and/or alert system may operate to capture images exterior of the vehicle and may process the captured image data to display images and to detect objects or other vehicles (such as vehicles that may not have a V2V communication system or radio) at or near the vehicle and in the predicted path of the vehicle, such as to assist a driver of the vehicle in maneuvering the vehicle. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

The system may operate responsive to the communications and to image processing of image data captured by a forward facing camera at the vehicle (such as a camera disposed at and behind the windshield of the vehicle and viewing forwardly through the windshield and in the direction of travel of the vehicle). For example, a forward facing camera may capture image data representative of the projected path of travel of the vehicle, and, via processing of such captured image data, an image processor may determine an object or objects present in the field of view of the camera and in the forward path of travel of the vehicle. The system includes a control that is operable to process vehicle information to determine an estimated time to arrival of the other vehicle at a location in a projected path of travel of the equipped vehicle. Responsive at least in part to a determination that the estimated time to arrival is less than a threshold amount, the control generates an alert to the driver of the equipped vehicle that it is not safe to proceed along the projected path of travel. Moreover, responsive at least in part to (i) a determination that the estimated time to arrival is greater than the threshold amount and (ii) a determination via image processing of captured image data that an object is present in the projected path of travel of the equipped vehicle, the control generates an alert to the driver of the equipped vehicle that it is not safe to proceed along the projected path of travel. Optionally, responsive at least in part to a determination that (i) the estimated time to arrival is greater than a threshold amount and (ii) a determination via image processing of captured image data that an object is not present in the projected path of travel of the equipped vehicle, the control may generate an indication to the driver of the equipped vehicle that it is safe to proceed along the projected path of travel.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular control system, said vehicular control system comprising:

a camera disposed at a front portion of a vehicle equipped with said vehicular control system, said camera having a field of view forward of the equipped vehicle;

a control comprising an image processor operable to process image data captured by said camera to determine an object present in the forward field of view of said camera;

wherein a projected path of travel of the equipped vehicle is determined at least in part by processing of captured image data by said image processor;

a communication system of the equipped vehicle, wherein said communication system is operable to receive vehicle information pertaining to another vehicle;

wherein said control is operable to process vehicle information received by said communication system to determine an estimated time to arrival of the other vehicle at a location on a road being travelled by the other vehicle that is in the projected path of travel of the equipped vehicle;
wherein the projected path of travel of the equipped vehicle comprises a turn by the equipped vehicle at an intersection;
wherein said control receives information pertaining to a state of a signal light at the intersection; and
wherein, responsive to the received information being indicative of the state of the signal light being green and responsive at least in part to (i) determination that the estimated time to arrival of the other vehicle is at least a threshold amount and (ii) determination via image processing of captured image data that an object is not present in the projected path of travel of the equipped vehicle, said control determines that it is safe for the equipped vehicle to proceed along the projected path of travel.

2. The vehicular control system of claim 1, wherein said communication system comprises a vehicle-to-vehicle communication system.

3. The vehicular control system of claim 2, wherein said control is responsive to data indicative of the location and trajectory of the other vehicle traveling on the road.

4. The vehicular control system of claim 3, wherein said control determines the estimated time to arrival of the other vehicle at least in part responsive to a determined speed of the other vehicle and a determined distance of the other vehicle from the equipped vehicle.

5. The vehicular control system of claim 1, wherein, responsive at least in part to the (i) determination that the estimated time to arrival is at least a threshold amount and (ii) determination via image processing of captured image data that an object is not present in the projected path of travel of the equipped vehicle, said control generates an indication to the driver of the equipped vehicle that it is safe to proceed along the projected path of travel.

6. The vehicular control system of claim 1, wherein the projected path of travel comprises a left turn by the equipped vehicle at the intersection onto the road being travelled by the other vehicle.

7. The vehicular control system of claim 6, wherein said control is responsive at least in part to a turn signal of the equipped vehicle.

8. The vehicular control system of claim 7, wherein said control receives information pertaining to the state of the signal light at the intersection via at least one of (i) a vehicle to vehicle communication and (ii) a vehicle to infrastructure communication.

9. The vehicular control system of claim 1, wherein said control receives information pertaining to the state of the signal light at the intersection via a vehicle to infrastructure communication.

10. The vehicular control system of claim 1, wherein said control receives information pertaining to the state of the signal light at the intersection via a vehicle to vehicle communication.

11. The vehicular control system of claim 1, wherein the other vehicle is travelling in a traffic lane of the road in a direction of travel, and wherein the projected path of travel of the equipped vehicle projects the equipped vehicle entering that traffic lane to travel in the same direction of travel as the other vehicle.

12. The vehicular control system of claim 1, wherein the other vehicle is travelling in a first traffic lane of the road in a direction of travel, and wherein the equipped vehicle is travelling in a second traffic lane of the road in a direction of travel opposite to that of the other vehicle, and wherein the projected path of travel of the equipped vehicle projects the equipped vehicle crossing the first traffic lane.

13. A vehicular control system, said vehicular control system comprising:
a camera disposed at a front portion of a vehicle equipped with said vehicular control system, said camera having a field of view forward of the equipped vehicle;
a control comprising an image processor operable to process image data captured by said camera to determine an object present in the forward field of view of said camera;
wherein a projected path of travel of the equipped vehicle is determined at least in part by processing of captured image data by said image processor;
a communication system of the equipped vehicle, wherein said communication system is operable to receive vehicle information pertaining to another vehicle;
wherein said control is operable to process vehicle information received by said communication system to determine an estimated time to arrival of the other vehicle at a location on a road being travelled by the other vehicle that is in the projected path of travel of the equipped vehicle;
wherein the projected path of travel of the equipped vehicle comprises a turn by the equipped vehicle at an intersection;
wherein the other vehicle is travelling in a first traffic lane of the road in a direction of travel, and wherein the equipped vehicle is travelling in a second traffic lane of the road in a direction of travel opposite to that of the other vehicle, and wherein the projected path of travel of the equipped vehicle projects the equipped vehicle crossing the first traffic lane; and
wherein, responsive at least in part to determination that the estimated time to arrival of the other vehicle is less than a threshold amount, said control engages a brake system of the equipped vehicle to limit movement of the equipped vehicle along the projected path of travel.

14. The vehicular control system of claim 13, wherein, responsive at least in part to determination that the estimated time to arrival of the other vehicle is less than the threshold amount, said control generates an alert to the driver of the equipped vehicle that it is not safe to proceed along the projected path of travel.

15. The vehicular control system of claim 13, wherein said control receives information pertaining to a state of a signal light at the intersection, and wherein, responsive to the state of the signal light not being green, said control engages the brake system of the equipped vehicle to limit movement of the equipped vehicle along the projected path of travel.

16. A vehicular control system, said vehicular control system comprising:
a camera disposed at a front portion of a vehicle equipped with said vehicular control system, said camera having a field of view forward of the equipped vehicle;
a control comprising an image processor operable to process image data captured by said camera to determine an object present in the forward field of view of said camera;
wherein a projected path of travel of the equipped vehicle is determined at least in part by processing of captured image data by said image processor;
a communication system of the equipped vehicle, wherein said communication system is operable to receive vehicle information pertaining to another vehicle;

wherein said control is operable to process vehicle information received by said communication system to determine an estimated time to arrival of the other vehicle at a location on a road being travelled by the other vehicle that is in the projected path of travel of the equipped vehicle;

wherein the projected path of travel of the equipped vehicle comprises a turn by the equipped vehicle at an intersection;

wherein, responsive at least in part to (i) determination that the estimated time to arrival of the other vehicle is at least a threshold amount and (ii) determination via image processing of captured image data that an object is not present in the projected path of travel of the equipped vehicle, said control determines that it is safe for the equipped vehicle to proceed along the projected path of travel; and wherein, responsive at least in part to determination that the estimated time to arrival of the other vehicle is less than the threshold amount, said control engages a brake system of the equipped vehicle to limit movement of the equipped vehicle along the projected path of travel.

17. The vehicular control system of claim 16, wherein the other vehicle is travelling in a first traffic lane of the road in a direction of travel, and wherein the equipped vehicle is travelling in a second traffic lane of the road in a direction of travel opposite to that of the other vehicle, and wherein the projected path of travel of the equipped vehicle projects the equipped vehicle crossing the first traffic lane.

18. The vehicular control system of claim 16, wherein the other vehicle is travelling in a traffic lane of the road in a direction of travel, and wherein the projected path of travel of the equipped vehicle projects the equipped vehicle entering that traffic lane to travel in the same direction of travel as the other vehicle.

19. The vehicular control system of claim 18, wherein said control receives information pertaining to a state of a signal light at the intersection, and wherein, responsive to the state of the signal light not being green, said control engages the brake system of the equipped vehicle to limit movement of the equipped vehicle along the projected path of travel.

20. The vehicular control system of claim 19, wherein the projected path of travel comprises a left turn by the equipped vehicle at the intersection onto the road being travelled by the other vehicle.

* * * * *